Patented Jan. 15, 1929.

1,698,714

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR CONTROLLING THE VULCANIZATION OF RUBBER AND SIMILAR MATERIALS.

No Drawing. Original application filed June 25, 1923, Serial No. 647,757. Divided and this application filed November 1, 1927. Serial No. 230,389.

This invention relates to processes for controlling the vulcanization of rubber and similar materials such as balata, gutta percha and synthetic rubber, and products obtained thereby. It is more particularly directed to processes for checking such vulcanization of rubber or the like combined with a vulcanizing agent, a material containing carbon disulphide, zinc or equivalent metal in combination and an amine or any one or more of such substances, and to products obtained thereby.

The principal object of the present invention is to provide a process for checking the vulcanization of rubber which shall be simple and efficient, particularly in causing sure curbing or checking of vulcanization of rubber in any form including latex, cements or solid rubber which has been partially or completely vulcanized. Another object of the invention is to provide a series of products resulting from such processes in which such control has been exercised and which will result in rubber articles having improved physical characteristics such as better resistance to ageing.

The invention accordingly comprises a process for controlling the vulcanization of rubber which includes causing a vulcanizing ingredient contained in rubber to react with a substance for checking the further vulcanizing function of the ingredient and at will treating the rubber with an agent causing vulcanization, and the products obtained thereby.

This application is a division of copending application Serial No. 647,757, filed June 25, 1923.

The term "agent" as herein employed is intended to include both chemical substances and physical forces such as heat.

The term "vulcanizing ingredient" as employed herein is intended to include a substance which is a component part of any combination or mixture which is capable of vulcanizing rubber.

In accordance with copending application No. 574,780, filed July 13, 1922, continued in applications Nos. 41,875, filed July 6, 1925; 681,066, filed Dec. 17, 1923, and copending application No. 574,797, filed July 13, 1922, now Patent No. 1,463,794, it has been shown that vulcanization at ordinary temperatures, approximately 70° F., occurs when four ingredients, M in combination, an amine, a material comprising sulphur and a material comprising carbon disulphide or carbon oxysulphide are present. (Above the ordinary temperature, say ranging upwards to 212° F. or 240-286° F. vulcanization in the presence of these substances occurs at an increased rate.) M represents zinc or mercury in the mercuric state when vulcanization at ordinary temperatures, approximately 70° F., is carried out, and when vulcanization above ordinary temperatures, the preferred metals are the following:—zinc, mercury, preferably in the mercuric state, cadmium, copper, preferably in the cupric state, arsenic, preferably in the arsenous state, manganese, preferably in the manganous state, and lead, preferably in the plumbous state. It has been found in accordance with the present invention that the vulcanization accomplished by the presence of these ingredients may be controlled by controlling the vulcanizing function of any one of the ingredients by treating it, preferably in rubber, with a substance which reacts chemically therewith, preferably without removing the reaction product where solid rubber is employed although it may be removed later if desired. The control of vulcanization in the manner constituting the present invention is particularly important in its action to prevent the further vulcanization of rubber compounds containing accelerators and other vulcanizing ingredients which vulcanize at ordinary temperatures or slightly above. Taking the process of vulcanization set forth in Cadwell's copending application, Sr. No. 441,691, filed February 1, 1921, in which rubber, zinc oxide, sulphur and oxy normal butyl thiocarbonic acid disulphide are combined and the compound so formed subsequently exposed to the vapors of aniline, constituting the fourth, i. e., amine ingredient, to effect vulcanization, if this compound without exposure to aniline or other amine be allowed to stand for a period of time at ordinary temperatures vulcanization is apt to occur, due it is believed to the action of the natural amine occurring in the rubber or to casual amine such as aniline picked up from the atmosphere of the factory, either of which may furnish the fourth ingredient required for vulcanization at ordinary temperature. The premature vulcanization mentioned occurs for instance in scrap rubber, that is pieces of rubber—usually small pieces—resulting from cutting or other processes for the manufacture of various rubber articles. By the present invention such premature vulcanization is avoided. If the premature vulcanization mentioned occurs it causes a serious loss of money in factory operations. Furthermore if vulcanized rubber is treated by the present process to check further vulcanization of the rubber, it has been found that further vulcanization substantially does not occur and thereby the ageing properties of the rubber are greatly improved.

Instead of causing reaction with natural or casual amine to occur in a compound containing rubber, zinc in combination, sulphur and oxy normal butyl thiocarbonic acid disulphide, either zinc in combination or the carbon disulphide-containing material for example oxy normal butyl thiocarbonic acid disulphide may be treated with a suitable substance to check its vulcanizing function.

In general in treating rubber containing vulcanizing ingredients, the following procedures may be employed:

1. For controlling the vulcanization by influencing the action of an amine or other basic nitrogenous matter constituting one of the four ingredients mentioned above, the amine may be rendered partially or totally inactive by treating it with an aldehyde of the aliphatic or aromatic series, such as formaldehyde, benzaldehyde, acetaldehyde, etc. or may be treated with an acid anhydride such as phthalic anhydride, or with nitroso bodies such as para nitrosodimethylaniline, nitroso beta naphthol, para nitrosodiethylaniline, or quinone, or similar materials and other bodies having similar properties. These substances lower the basicity of the amine or other basic nitrogenous matter present. Where the amine or other basic nitrogenous matter is not one of the four ingredients but is used for example with zinc in combination and sulphur, the treatment with aldehyde actually increases the activity of the amine. But treatment with an anhydride such as phthalic anhydride or nitroso bodies or quinone or other bodies having similar properties checks the vulcanizing function of the amine.

2. For controlling the vulcanization by influencing the action of the carbon disulphide-containing material, an excess of either an aliphatic amine or ammonia or hydrogen sulphide may be employed. The amine employed should be a primary amine.

3. For controlling the vulcanization by influencing the action of the zinc or similar metal, hydrogen sulphide may be employed or similar substance to form a less active compound. The zinc sulphide formed when hydrogen sulphide is used is a less active form of zinc in combination.

4. For controlling vulcanization by influencing the action of sulphur where sulphur constitutes one of the four ingredients mentioned above various unsaturated bodies may be employed such as palm oil, rosin and pine tar.

The substances for controlling the vulcanizing functions of these various vulcanizing ingredients leave the rubber substantially unchanged physically. The rubber may be employed in various states such as latex, raw rubber, or products intermediate between latex and raw rubber, such as rubber sponge, as set forth in United States patents of Ernest Hopkinson, 1,423,525 and 1,423,526; rubber which has been compounded and is partially or fully vulcanized rubber. The various substances, either in the gaseous, liquid or solid state may be absorbed, diffused or introduced by painting, etc.

The process may also be carried out by using vulcanized rubber resulting from the vulcanization of a compound made up from 100 parts of rubber, 10 parts of zinc oxide, 2 parts of dibenzylamine and 6 parts of sulphur vulcanized by treatment with the mixed vapors of carbon disulphide and carbontetrachloride at 180-200° F. as disclosed in my application Serial No. 574,797 filed July 13, 1922, now patent No. 1,463,794. After treatment with carbon disulphide and carbon tetrachloride as indicated the vulcanized rubber is maintained over night in a receptacle of appropriate size to which has been added an amount of formaldehyde equal to 0.01 part of the weight of the rubber being treated. Formaldehyde is preferably introduced in the gaseous form which may be produced in any desired manner. If large amounts of rubber and large receptacles are employed it is necessary to circulate the gases in order that all of the rubber may be exposed thereto. Since the formaldehyde penetrates the rubber in order to react with the amine, it is desirable that the rubber be exposed thereto in thin sheets, say 0.1 inch or less in thickness although other thicknesses may be employed if desired. After treatment with formaldehyde the gas is blown out of the receptacle and the treated rubber aerated in a current of air until the odor of formaldehyde is lost. The treatment just given retards the vulcanization of the compound. Without such treatment the compound will continue to vulcanize until practically all six parts of the sulphur have combined with the rubber thus producing an over-vulcanized product. By the process given vulcanization is substantially retarded and over-vulcanization of the material is reduced.

If desired an aldehyde, which due to the fact that it exists as a liquid at ordinary temperature and is therefore not so apt to leave the rubber as formaldehyde, may be introduced into the rubber. Such an aldehyde is benzaldehyde. It may be introduced as follows: 100 parts of rubber which may contain casual amine or which may subsequently absorb a casual amine are mixed with 2 parts of zinc oxide, 2 parts of oxy normal butyl thiocarbonic acid disulphide and 2 parts of sulphur. This compound after vulcanization and preferably in the form of masses of approximately 0.1 inch thickness or less is maintained over night in a receptacle containing benzaldehyde liquid whose vapors at ordinary temperature are distributed about the receptacle and penetrate the rubber mass, reacting with any casual amine already present. Thereafter the rubber so compounded is removed and a quantity of benzaldehyde remains therein so that any causal amine that may come in contact with the rubber will be neutralized by the benzaldehyde present. The vulcanization of the compound is accordingly retarded.

Instead of benzaldehyde, paranitrosodimethylaniline in solid form may be introduced in the receptacle mentioned in the above example. At ordinary temperature material volatilizes sufficiently to be absorbed by the rubber. Amounts of benzaldehyde or para nitrosodimethylaniline are employed to permit absorption by the rubber of a sufficient amount to react with the amine with an excess remaining at the end of the period of exposure.

As another example employing vulcanized rubber derived from latex for instance, combined with various vulcanizing ingredients, the following process may be carried out:—
Latex sufficient to produce 100 parts of dry rubber is compounded with 0.5 part of zinc oxide, 1.5 parts of zinc dimethyldithiocarbamate, 6 parts of sulphur, and vulcanized at 212° F. for approximately 1 hr. at the end of which time the vulcanized compound in sheets or threads $\frac{1}{10}''$ in thickness or less is treated with hydrogen sulphide gas at ordinary temperatures, 70° F., for 24 hrs. The hydrogen sulphide reacts with zinc oxide and zinc dimethyldithiocarbamate to check their vulcanizing function. In this way over-vulcanization of the compound is checked.

Vulcanized rubber derived from a compounded rubber consisting of 100 parts of rubber, 3 parts of oxy normal butyl thiocarbonic acid disulphide, 2 parts of zinc oxide, and 2 parts of sulphur which may contain casual amine or which may subsequently absorb amine may be prevented from further vulcanization by treating with a 14% aqueous solution of ammonia, in which the vulcanized rubber is allowed to remain for 24–36 hrs., after which time it is removed and dried at ordinary temperatures. By this treatment the oxy normal butyl thiocarbonic acid disulphide is decomposed and further vulcanization stopped. Instead of immersing the vulcanized rubber in aqueous ammonia, it may be kept in ammonia gas for 24–36 hrs, at ordinary temperatures. It is pointed out that with a certain concentration of ammonia, the rubber compound will vulcanize under the action thereof acting in this instance as a substitute for the later applied aniline. But where employed as in the example given no such vulcanization occurs and the decomposition of the oxy normal butyl thiocarbonic acid disulphide proceeds.

Vulcanized rubber derived from 100 parts of rubber, 10 parts of zinc oxide, and 10 parts of oxy normal butyl thiocarbonic acid disulphide may be similarly treated to prevent further vulcanization. In this compound the oxy normal butyl thiocarbonic acid disulphide acts as a vulcanizing agent furnishing sulphur to accomplish the vulcanization. The above described treatment prevents such vulcanization from going further.

The further vulcanizing influence of the zinc oxide may be checked. A vulcanized rubber obtained from 100 parts of rubber, 2 parts each of zinc oxide, sulphur and oxy normal butyl thiocarbonic acid disulphide may be exposed to an atmosphere of hydrogen sulphide gas for 24 hrs. The zinc oxide reacts to form zinc sulphide, which is a less active form of vulcanizing ingredient, and accordingly further vulcanization of the mass is checked. At the same time the oxy normal butyl thiocarbonic acid disulphide is also decomposed.

Instead of oxy normal butyl thiocarbonic acid disulphide mentioned in any of the above examples, the following vulcanizing ingredients may be substituted to be treated by the processes before-mentioned herein: Zinc butyl xanthogenate, thiobenzoyl-monosulphide, oxy ethylthiocarbonic acid disulphide and zinc dithiobenzoate in compounds or cements. The proportion of each of these materials preferably employed is as follows: 100 parts of rubber, 10 parts of zinc oxide, 3 parts of sulphur and from 0.1 to 3 parts of the zinc butyl xanthogenate, thiobenzoyl-monosulphide, oxy ethylthiocarbonic acid disulphide or zinc dithiobenzoate.

It will be observed that oxy normal butyl thiocarbonic acid disulphide, zinc dithiobenzoate, zinc butyl xanthogenate, thiobenzoylmonosulphide, oxy ethylthiocarbonic acid disulphide are representatives of a large class of materials whose action may be controlled in a manner similar to that above set forth. This class of materials includes thiol salts, disulphides and monosulphides some of which are set forth in my Patents 1,440,962, 1,440,963, 1,440,964, 1,440,961, and my copending applications Sr. Nos. 548,828, 548,829, 548,831, now issued as U. S. Patents 1,532,226, 1,532,227 and 1,510,652 respectively. In the patents herein mentioned and in general where it is desired to control the vulcanization of rubber by chemically treating vulcanizing ingredients or particularly where it is desired to control the vulcanization of rubber containing sulphur and amine, zinc or equivalent metal, carbon disulphide or materials containing the group $$\begin{array}{c} CS \\ \parallel \\ X \end{array}$$

where X represents sulphur or a substitute element or group the processes herein set forth may be employed.

The processes herein set forth are simple and efficient. They cause either partial or complete stoppage of vulcanization when applied to the various types of rubber employed containing one or more vulcanizing ingredients. Products in which over-vulcanization has been prevented by the processes herein included have a correspondingly increased resistance to ageing.

It will thus be seen that among others the objects of the invention above enumerated are achieved.

Having thus described my invention, what I claim and desire to protect by Letters Patent is:

1. A process for controlling the vulcanization of rubber which comprises treating vulcanized rubber containing an accelerating ingredient with a material to check the functioning of said ingredient.

2. A process for controlling the vulcanization of rubber which comprises treating vulcanized rubber containing before vulcanization the four ingredients, sulphur, zinc in combination, carbon disulphide and an amine with a substance to check the vulcanizing function of one of these ingredients.

3. A process for controlling the vulcanization of rubber which comprises subjecting vulcanized rubber containing an accelerating ingredient to a substance adapted to be absorbed by the rubber to check the vulcanizing function of the accelerating ingredient.

4. A process for controlling the vulcanization of rubber which comprises subjecting vulcanized rubber containing an accelerating ingredient to formaldehyde adapted to be absorbed by the rubber to check the vulcanizing function of the accelerating ingredient.

5. A process for controlling the vulcanization of rubber which comprises treating vulcanized rubber derived from rubber containing sulphur, carbon disulphide, amine and zinc in combination with a substance in vapor form thereby to check the further vulcanizing function of at least one of said vulcanizing ingredients.

Signed at New York, county and state of New York, this 26th day of October, 1927.

SIDNEY M. CADWELL.